US012559995B2

(12) United States Patent
Jacobsen et al.

(10) Patent No.: US 12,559,995 B2
(45) Date of Patent: Feb. 24, 2026

(54) METHOD FOR MONITORING AN INTERIOR OF A MOTOR VEHICLE BY MEANS OF A MONITORING SYSTEM, COMPUTER PROGRAM PRODUCT, COMPUTER-READABLE STORAGE MEDIUM, AND MONITORING SYSTEM

(71) Applicant: Gestigon GmbH, Luebeck (DE)

(72) Inventors: Finn Jacobsen, Luebeck (DE); Lisa Jaeschke, Luebeck (DE); Franziska Teichmann, Luebeck (DE)

(73) Assignee: Gestigon GmbH, Luebeck (DE)

( * ) Notice: Subject to any disclaimer, the term of this patent is extended or adjusted under 35 U.S.C. 154(b) by 3 days.

(21) Appl. No.: 18/723,050

(22) PCT Filed: Dec. 13, 2022

(86) PCT No.: PCT/EP2022/085546
§ 371 (c)(1),
(2) Date: Jun. 21, 2024

(87) PCT Pub. No.: WO2023/117573
PCT Pub. Date: Jun. 29, 2023

(65) Prior Publication Data
US 2025/0055960 A1      Feb. 13, 2025

(30) Foreign Application Priority Data
Dec. 22, 2021    (DE) ..................... 10 2021 134 234.1

(51) Int. Cl.
E05B 81/56      (2014.01)
G01S 13/62      (2006.01)

(52) U.S. Cl.
CPC .............. *E05B 81/56* (2013.01); *G01S 13/62* (2013.01)

(58) Field of Classification Search
CPC ......... E05B 81/56; G01S 13/62; G08B 21/06; G08B 13/19647; G08B 21/22; B60N 2/267; B60N 2/0029
See application file for complete search history.

(56) References Cited

U.S. PATENT DOCUMENTS 7,983,817 B2 *   7/2011   Breed ................... B60R 21/013
                                                    367/137
8,892,302 B1 *  11/2014   McDonald ............. G08B 21/22
                                                    701/36
(Continued)

FOREIGN PATENT DOCUMENTS

DE    10 2004 053 328 A1    6/2005
DE    10 2011 011 939 A1    8/2012
(Continued)

OTHER PUBLICATIONS

Search Report Issued in Corresponding German Application No. 10 2021 134 234.1, dated Jul. 29, 2022. (7 Pages).
(Continued)

*Primary Examiner* — Curtis J King
(74) *Attorney, Agent, or Firm* — Dinsmore & Shohl LLP

(57) ABSTRACT
A method for monitoring an interior of a motor vehicle with a monitoring system includes detecting a movement of an object in the interior with a motion detection device, activating an optical detection device to record an image sequence using an electronic computing device, and transmitting the image sequence to a mobile terminal of a user using a communication device.

13 Claims, 2 Drawing Sheets

(56)                References Cited

U.S. PATENT DOCUMENTS

Figure 1:
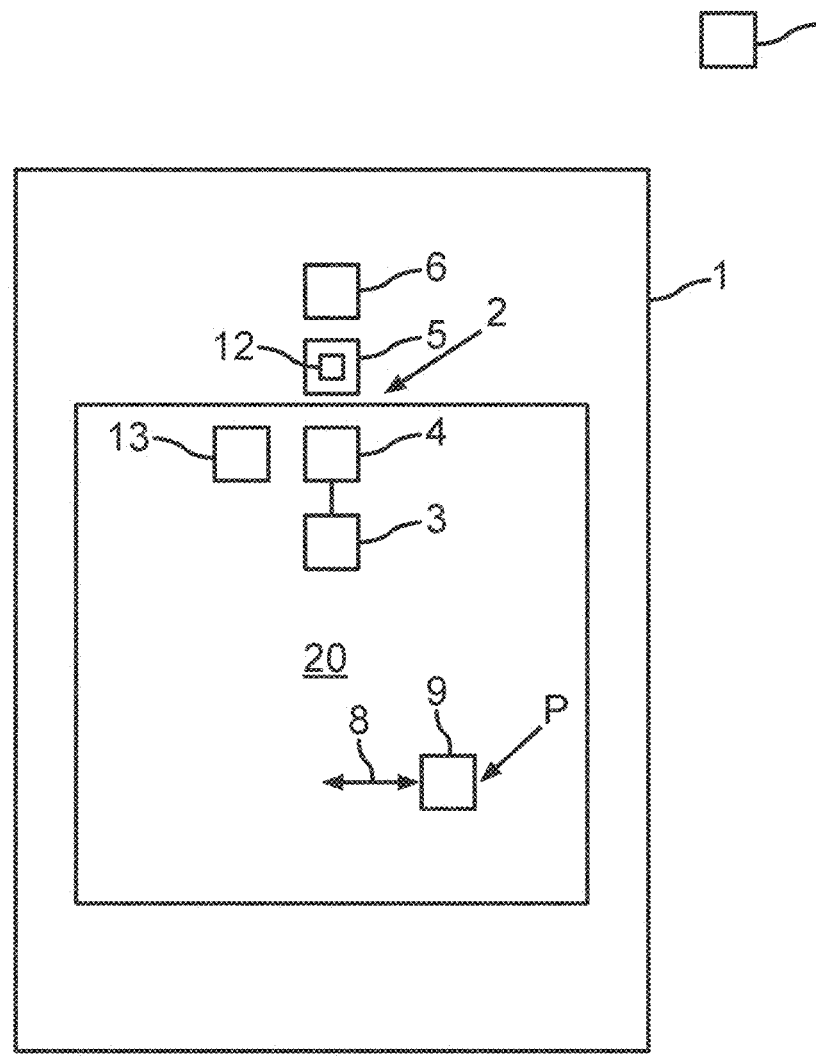

| | | | | |
|---|---|---|---|---|
| 9,845,050 | B1 * | 12/2017 | Garza | G08B 21/0205 |
| 9,847,004 | B1 * | 12/2017 | Lan | G08B 21/24 |
| 10,276,016 | B2 * | 4/2019 | Mattarocci | G08B 21/0266 |
| 10,457,200 | B2 * | 10/2019 | Gage | G01N 33/004 |
| 11,145,178 | B1 * | 10/2021 | Jones | G08B 21/24 |
| 11,198,388 | B1 * | 12/2021 | Crose | B60N 2/0035 |
| 11,217,083 | B1 * | 1/2022 | Luo | G06N 3/08 |
| 11,250,685 | B2 * | 2/2022 | Taylor | G01S 13/04 |
| 11,590,934 | B2 * | 2/2023 | Moeller | G06Q 30/0635 |
| 11,747,313 | B2 * | 9/2023 | Hernandez | B60H 1/00964 |
| | | | | 701/49 |
| 11,766,977 | B2 * | 9/2023 | Beach | B60N 2/28 |
| | | | | 340/425.5 |
| 11,961,388 | B2 * | 4/2024 | Hagström | G08B 13/19647 |
| 2005/0057350 | A1 * | 3/2005 | Younse | G08B 21/22 |
| | | | | 340/457.1 |
| 2006/0012679 | A1 * | 1/2006 | Ressler | G08B 13/1961 |
| | | | | 348/148 |
| 2006/0033613 | A1 * | 2/2006 | Reece | B60Q 1/52 |
| | | | | 340/457 |
| 2009/0146813 | A1 | 6/2009 | Nuno | |
| 2013/0286204 | A1 | 10/2013 | Cheng | |
| 2014/0253314 | A1 * | 9/2014 | Rambadt | G08B 21/0266 |
| | | | | 340/457.1 |
| 2014/0277935 | A1 * | 9/2014 | Daman | B60N 2/002 |
| | | | | 348/148 |
| 2015/0137962 | A1 * | 5/2015 | Binnicker | B60N 2/26 |
| | | | | 340/457 |
| 2015/0332578 | A1 * | 11/2015 | Borgne | B60N 2/272 |
| | | | | 340/667 |
| 2017/0190287 | A1 * | 7/2017 | Gjoni | G08B 21/24 |
| 2018/0065504 | A1 * | 3/2018 | Lan | B60W 10/30 |
| 2019/0251818 | A1 * | 8/2019 | Nagatomi | G08B 21/0205 |
| 2020/0290567 | A1 | 9/2020 | Funyak et al. | |
| 2021/0114485 | A1 * | 4/2021 | Ito | G06V 20/00 |
| 2021/0245763 | A1 * | 8/2021 | Gomez | G01S 7/2883 |
| 2021/0291730 | A1 * | 9/2021 | De La Cruz | G08B 21/24 |
| 2022/0161761 | A1 | 5/2022 | Moeller et al. | |
| 2022/0379898 | A1 * | 12/2022 | Kawamura | G08B 21/24 |

FOREIGN PATENT DOCUMENTS

| | | | |
|---|---|---|---|
| DE | 10 2015 002 802 A1 | 8/2015 |
| DE | 10 2017 004 465 A1 | 11/2017 |
| EP | 1914128 A1 | 4/2008 |
| WO | 2015/155143 A1 | 10/2015 |

OTHER PUBLICATIONS

International Search Report Issued in Corresponding PCT Application No. PCT/EP2022/085546, dated Mar. 31, 2023. (7 Pages with English Translation).

Written Opinion from the International Research Authority Issued in Corresponding PCT Application No. PCT/EP2022/085546, dated Mar. 31, 2023. (7 Pages).

* cited by examiner

METHOD FOR MONITORING AN INTERIOR OF A MOTOR VEHICLE BY MEANS OF A MONITORING SYSTEM, COMPUTER PROGRAM PRODUCT, COMPUTER-READABLE STORAGE MEDIUM, AND MONITORING SYSTEM

The invention relates to a method for monitoring an interior of a motor vehicle by means of a monitoring system according to the current patent claim 1. Furthermore, the invention relates to a computer program product, a computer-readable storage medium, and a monitoring system.

It is already known from the prior art that interiors of motor vehicles can be monitored by means of a camera, for example. For example, while the vehicle is being driven, the driver can be monitored to detect any driver fatigue. Furthermore, it is already known that a camera is permanently arranged in the interior of the motor vehicle and constantly monitors the interior if the user or the driver is absent.

US 2013/286204 A1 describes a camera mounted on a motor vehicle, which is used to monitor the motor vehicle. The camera comprises an external housing, a camera module with a camera lens, a lighting component, a dimmer switch and a transmission medium. The external housing can be made of an alloy. The camera module can capture video data and the transmission medium can be coupled to the camera module to transmit the captured video data to an external device as a live video stream.

US 2009/146813 A1 describes a system for installation in motor vehicles that detects forgotten or abandoned passengers and notifies the driver by e-mail, mobile phone, car alarm or by other means, allowing the release or rescue of trapped passengers.

The object of the present invention is to provide a method, a computer program product, a computer-readable storage medium, and a monitoring system, by means of which an improved monitoring of an interior of a motor vehicle can be carried out.

This object is achieved by a method, a computer program product, a computer-readable storage medium, and a monitoring system according to the independent patent claims. Advantageous embodiments are specified in the dependent claims.

One aspect of the invention relates to a method for monitoring an interior of a motor vehicle by means of a monitoring system. A movement of an object in the interior is detected by means of a motion detection device of the monitoring system. An optical detection device for recording an image sequence is activated by means of an electronic computing device of the monitoring system. The image sequence is then transmitted to a mobile terminal of a user of the monitoring system by means of a communication device of the monitoring system.

Thus, improved monitoring of an interior region can be implemented. In particular, therefore, only motion detection takes place as the monitoring, and if in turn a movement is then detected, the optical detection means, for example a camera, is only then activated. In particular, electrical energy can thus be saved because the activation and the recording of the image sequence is only carried out when a movement is detected. In particular, in at least partially electrically powered motor vehicles or in a fully electrically powered motor vehicle, electrical energy can thus be saved, whereby, for example, the range of the at least partially electrically powered motor vehicle or the fully electrically powered motor vehicle can be increased.

For example, the image sequence can be transmitted to the mobile terminal as a live stream. This makes it possible to inform the user or owner of the motor vehicle about the movement in the motor vehicle in real time. For example, if a break-in at the motor vehicle is detected, appropriate measures can be taken to inform the police or the like. It can also be provided that, for example, an automated emergency call is initiated if such a break-in is detected.

In particular, the image sequence can be transmitted to an application of the mobile terminal. For example, a kind of "push message" can be generated if, for example, the movement is detected. The user can then be informed via the push message that an unauthorized movement within the interior has been detected. By activating the push message on the mobile device, for example, the live stream can then be displayed.

The mobile terminal is preferably an intelligent telephone, which is also referred to as a smartphone. For example, tablet PCs or other mobile terminals can be used as an alternative or as a supplement. The mobile terminal preferably also has a communication device, which can communicate with the communication device of the monitoring system. For example, this can take place over a mobile network.

In particular, the user may have already authenticated him/herself via the application, so that a coupling between the mobile terminal and the monitoring system has been carried out. This can prevent unauthorized access to the monitoring system.

The motion detection device can be arranged, for example, on a roof lining of the motor vehicle, thereby enabling a reliable monitoring of the interior by means of a single motion detection device.

The motion detection device and the optical detection device are preferably designed separately from each other, but can be arranged in the same region within the motor vehicle.

In particular, in other words it can therefore be suggested that if the user of the motor vehicle or a driver of the motor vehicle is not in the vicinity of the motor vehicle, there may be a break-in or an unauthorized entry of the motor vehicle. After leaving the vehicle, for example, the user can set the monitoring system to an alarm mode and the monitoring system notifies this in the event of a detected movement in the vehicle and records the corresponding video stream, i.e. the recorded image sequence.

In particular, it can thus be provided that when the driver leaves the vehicle, the vehicle sends a notification to the mobile phone that a movement in the car has been detected and, for example, whether the stream should then be retrieved by the user. Once motion is detected, the image sequence is also recorded. For example, the user can "click" on a confirmation in an application and sees the corresponding video stream from the interior of the motor vehicle on the mobile terminal and can, for example, detect the object in the interior. The user can react accordingly and, for example, inform the police and even has a video of the break-in, which he/she can then present to the police, for example.

In another scenario, for example, a child might enter the vehicle without anyone noticing, and not get out of the vehicle again on its own, for example, because a child lock on the doors is activated. In this case, the driver can also receive an alarm on the phone and could immediately check via video stream whether the child is in the car and locate it accordingly to get the child out.

In another use case, the user can check whether he or she has left their bag in the car, for example, but the distance to the car may be very long. The video stream can then be used to check whether the bag is in the car or not. The video stream is in particular the image sequence.

According to an advantageous embodiment, the optical detection device is provided as a camera. In particular, the camera can be provided, for example, as an infrared camera and, for example, perform appropriate monitoring even in low ambient light. In particular, a night vision capability for the camera can be provided. In particular, once the motion has been detected by the motion detection device, the camera is activated, so that less electrical energy is consumed. The camera can be located, for example, in a roof lining of the motor vehicle and thus reliably monitor the interior.

Furthermore, it has proven to be advantageous if the motion detection device is provided as a radar sensor device. This makes it possible to reliably monitor the interior by means of the radar sensor device. The radar sensor device can in particular create a three-dimensional image of the interior and thus, for example, also be designed for detecting the position of the object. Preferably, the radar sensor device can be formed in the roof lining of the motor vehicle so that a reliable interior monitoring can be realized.

Furthermore, it has proven to be advantageous if the radar sensor device is operated in the frequency band of 60 GHz. This frequency band extends from 57 GHz-64 GHz. If, for example, the motor vehicle is provided as an at least partially electrically powered motor vehicle or as a fully electrically powered motor vehicle, the radar sensor device can carry out the interior monitoring in this frequency band with little electrical energy. Thus, a higher range of the motor vehicle can be achieved. Alternatively, the radar sensor can be operated in the 79 GHz band, which extends from 77 GHz to 81 GHz.

It is also advantageous if an object classification is carried out by means of the motion detection device. For example, a differentiation between people and animals can be realized. In particular, a corresponding threshold can be configured, for example by the user, so that when an optical movement, for example of a fly, is detected, no activation of the optical detection device is carried out. In addition, for example, animals such as dogs or cats can be detected accordingly, so that they can remain in the interior without requiring activation of the optical detection device to be carried out. In particular, it can be provided, for example, that the object classification can be preset, in particular by the user of the motor vehicle, so that it can be specified in which movement scenario an activation of the camera has to be carried out. Thus, the interior monitoring can be reliably carried out without, for example, false alarms being received by the user.

It is also advantageous if, depending on the object classification, activation of the optical detection device is suppressed. If, for example, a fly or a pet is classified as an object, the activation of the optical detection device can be suppressed. In particular, it is possible for the activation of the optical detection device to be realized only above a certain threshold limit, which can be specified, for example, by the user. This allows false alarms to be reduced while at the same time saving electrical energy.

It has proved further advantageous if a further functional device of the motor vehicle, in particular a child lock, is activated depending on the object classification. If, for example, a child is classified as an object, the child lock device can be deactivated so that, for example, the child can leave the vehicle independently. This has the particular advantage that, for example, the user does not have to go directly to the car in order to let the detected child out of the car interior.

In a further advantageous embodiment, a position of the detected object in the interior is determined by means of the motion detection device and the detected position is transmitted to the mobile terminal with the image sequence. In particular, it is then possible to detect, for example, the position in the motor vehicle at which a corresponding movement was detected. This allows the user to be informed of the position at which the movement occurred. It is also possible that, for example, corresponding zones within the interior are excluded for motion detection. This has the advantage that, for example, if a pet is left in the rear of the vehicle, this region can be excluded from motion detection, which prevents false alarms.

In a further advantageous embodiment, the presence of an access authorization device for the motor vehicle is monitored by means of the monitoring system and in the absence of the access authorization device, the monitoring of the interior is initiated. The access authorization device can be, for example, a key of the motor vehicle. If the access authorization device is present in the motor vehicle, monitoring is suppressed, because the driver is present. If the absence of the access authorization device is determined, the interior monitoring can be initiated automatically. This means that the monitoring system can be activated in an extremely convenient manner.

It is further advantageous if a current position of the mobile terminal is transmitted to the monitoring system and the monitoring of the interior is initiated depending on the position. For example, the position can be transmitted to the motor vehicle via the application in the mobile terminal. If, for example, the person with the mobile terminal moves away from the vehicle by a predetermined distance, an automatic activation of the monitoring system can be carried out, which makes the interior surveillance extremely convenient to implement.

According to a further advantageous embodiment, on the detection of a movement of the object in the interior, a warning message is additionally transmitted to the mobile terminal.

This allows the user to be informed when a movement of the object in the vehicle has been detected. In particular, this can be carried out, for example, in a form of push message on an application on the mobile terminal.

Furthermore, it has proven to be advantageous if the image sequence is stored on a memory device of the monitoring system for future retrieval by means of the mobile terminal and/or by means of a display device of the motor vehicle. This enables, for example, the image sequence to be stored over an extended period of time, so that it can be retrieved. If, for example, a break-in is detected, the user can forward the corresponding image sequence, in particular video stream, to other locations accordingly and thus have an improved monitoring of the interior carried out.

The method presented is in particular a computer-implemented method. Therefore, a further aspect of the invention relates to a computer program product with program code means, which when the program code means are processed by the electronic computing device, cause said electronic computing device to carry out a method according to the preceding aspect. The computer program product may also be referred to as a computer program. A further aspect of the invention therefore relates to a computer-readable storage medium having at least the computer program product according to the preceding aspect.

The invention also relates to a monitoring system for monitoring an interior of a motor vehicle, having at least one motion detection device, with an optical detection device, with an electronic computing device and with a communication device, wherein the monitoring system is designed to carry out a method according to the preceding aspect. In particular, the method is carried out by means of the monitoring system.

The electronic computing device comprises, for example, processors, integrated circuits and further electronic components to be able to carry out corresponding method steps.

The invention also relates to a motor vehicle having a monitoring system according to the preceding aspect. The motor vehicle may preferably be designed to be at least partially electric or also fully electric. In addition, the motor vehicle may also be provided with an internal combustion engine or other drive options.

Advantageous embodiments of the method are to be viewed as advantageous embodiments of the computer program product, the computer-readable storage medium, and the monitoring system. The monitoring system and the motor vehicle have concrete features for this purpose which enable the method or an advantageous embodiment thereof to be carried out.

Further features of the invention can be found in the claims, the figures, and the description of the figures. The features and combinations of features that are cited in the description above and also the features and combinations of features that are cited in the description of the figures below and/or shown in the figures alone can be used not only in the respectively indicated combination but also in other combinations without departing from the scope of the invention. The invention is therefore also intended to be considered to comprise and disclose embodiments that are not explicitly shown and explained in the figures but that result and can be generated from the explained embodiments, by way of separate combinations of features. Embodiments and combinations of features that therefore do not have all the features of an originally formulated independent claim should also be regarded as disclosed. Embodiments and combinations of features that go beyond or differ from the combinations of features set out in the back-references of the claims should furthermore be considered to be disclosed, in particular by the embodiments described above.

Figure 2:
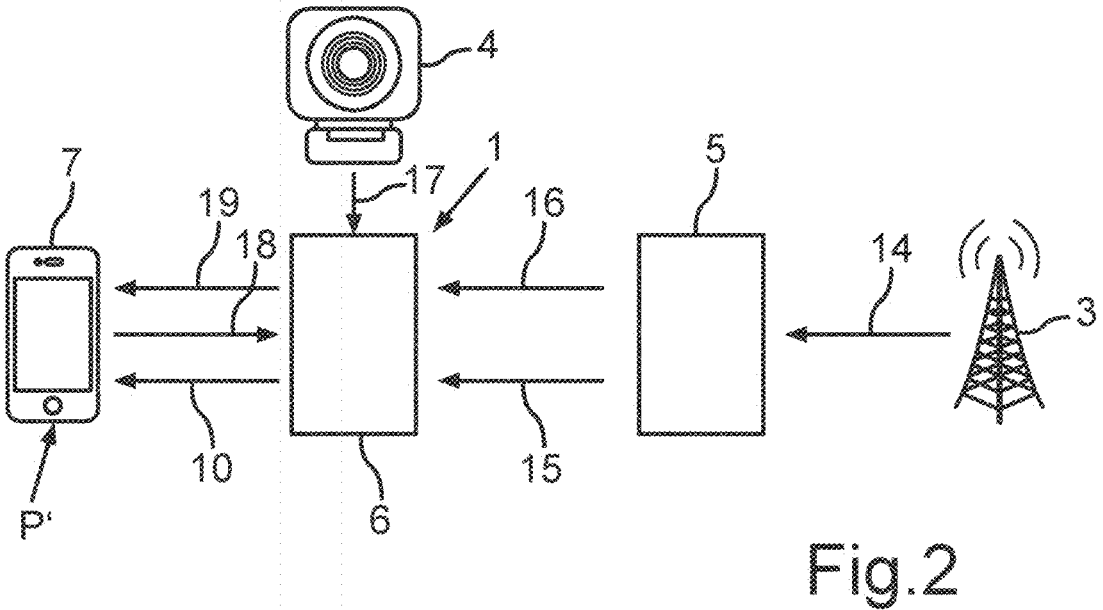

In the figures:

FIG. 1 shows a schematic plan view of an embodiment of a motor vehicle with an embodiment of a monitoring system; and FIG. 2 shows a schematic flow chart according to one embodiment of the method.

In the figures, identical or functionally identical elements are provided with the same reference numerals.

FIG. 1 shows a schematic plan view of an embodiment of a motor vehicle 1 with an embodiment of a monitoring system 2. The monitoring system 2 is designed for monitoring an interior 20 of the motor vehicle 1. The assistance system 2 has at least one motion detection device 3 and an optical detection device 4. Furthermore, the monitoring system 2 has at least one electronic computing device 5 and a communication device 6.

The motion detection device 3 may preferably be configured as a radar sensor device, in particular as a low-frequency radar sensor device. The optical detection device 4 is designed, in particular, as a camera. The communication device 6 is designed in particular for communication with a mobile terminal 7 (FIG. 2). For this purpose, for example, communication between the mobile terminal 7 and the communication device 6 can be realized via a mobile data network.

In particular, it is provided that, in order to monitor the interior 20, a movement 8 of an object 9 in the interior 20 is detected by means of the motion detection device 3. The activation of the optical detection device 4 for recording an image sequence 10 (FIG. 2) is carried out by means of the electronic computing device 5. The image sequence 10 is transmitted by means of the communication device 6 to the mobile terminal 7, which is designed in particular as an intelligent telephone, in particular as a so-called smartphone, of a user of the monitoring system 2.

In particular, it can also be provided that by means of the motion detection device 3, a position P of the detected object 9 in the interior 20 is determined and the detected position P is transmitted to the mobile terminal 7 with the image sequence 10.

Further, it can be provided in particular that, by means of the monitoring system 2, the presence of an access authorization device 11, for example a key for the motor vehicle 1, is monitored and, in the absence of the access authorization device 11, the monitoring of the interior 20 is initiated, in particular automatically initiated. Furthermore, a current position P' of the mobile terminal 7 can also be transmitted to the monitoring system 2 and the monitoring of the interior 3 can be initiated depending on the position P'. If, for example, the position P' should exceed a corresponding distance threshold to the motor vehicle 1, the monitoring of the interior 20 can be initiated automatically. The distance threshold value used is freely configurable.

Furthermore, it may be provided that the electronic computing device 5 has a memory device 12, for example, wherein the image sequence 10 is stored for future retrieval by means of the mobile terminal 7 and/or by means of a display device 13 of the motor vehicle 1.

FIG. 2 shows a schematic flow chart according to one embodiment of the method. By means of the motion detection device 3, in particular, an evaluation can be carried out on the electronic computing device 5. For example, the motion detection device 3 can communicate with the electronic computing device 5 via a so-called CAN bus 14. It can then be provided that an activity detection 15 and/or an object classification 16 are performed.

In the object classification 16, for example, it can be provided that a child can be detected in the interior 20. In addition, for example, pets or other animals can also be detected in the motor vehicle 1. In particular, it can thus be provided that, depending on the object classification 16, activation of the optical detection device 4 is suppressed. For example, if the object is a pet or a fly, activation of the optical detection device 4 can be suppressed so that false alarms are not transmitted to the user. Furthermore, it may be provided, for example, if the object classification 16 shows that the object is a child, that a further functional device of the motor vehicle 1, in particular a child lock device in the motor vehicle, can be activated accordingly, so that, for example, the child can leave the interior 20 independently.

The optical detection device 4 can be coupled, for example, via a so-called USB connection 17, to the motor vehicle 1, in particular to the electronic computing device 5. Via the communication device 6, the activity detection 15 can then be transmitted in turn to the mobile terminal 7. From the mobile terminal 7 in turn, in particular, a so-called authentication 18 can be transmitted, thus confirming that the mobile terminal 7 is also entitled to receive the corresponding image sequence 10 and the warning messages. In particular, it can also be provided that a warning message 19 is also transmitted to the mobile terminal 7, in particular via the so-called radar events. For example, the warning message 19 can be sent to the mobile device 7 and displayed in the form of a push message. In particular, an application can be available on the mobile terminal 7 for this purpose.

In particular, it is therefore proposed that the monitoring system 2 is formed of two components, for example. Firstly, the electronic computing device 5 in the motor vehicle 1, which monitors the activities in the motor vehicle 1, and secondly the mobile terminal 7, which allows the interior of the motor vehicle 1 to be viewed by means of the optical detection device 4. The radar sensor device is used in the motor vehicle 1 to monitor the activity in the motor vehicle 1 at any time, while the camera is only active when movement is detected. A specially developed software checks whether objects 9 are located in the motor vehicle 1 and when the recognized object 9 is a person, for example, classify whether it is a child. The results are then transmitted to the smart telephone 7 via the image sequence 10.

For example, the smart telephone can perform the logical interpretation of the events. If the motor vehicle 1 is in an alarm mode, for example when it is locked, the corresponding incoming signals trigger an alarm when the motion 8 is detected. The user can then be alerted via a notification and will additionally receive a message, in particular via an application. If, for example, no alarm is activated accordingly, then it is possible to check at any time whether a child is alone in the car. If this is the case, a notification and/or an alert will also be displayed in the application under certain conditions.

The conditions may vary and depend on circumstances. For example, there may be time-related conditions, for example the user is reminded after a prescribed period of time, additional information such as temperature, wherein the user is alerted above a certain temperature limit, or the state of the application, for example, whether the motor vehicle 1 is in parking mode or a "I will be right back" mode.

If the user is made aware of activities in the motor vehicle 1, he/she can open the image sequence 10 to see what is happening in the motor vehicle 1. For this purpose, the authentication is first sent from the mobile terminal 7 to the motor vehicle 1. This ensures that not everyone can access the optical detection device 4 in the motor vehicle 1. For this purpose, a security token is preferably exchanged, which confirms that the authorizations for the optical detection device 4 are present on the mobile terminal 7. The token is created in advance by coupling the mobile terminal 7 and the motor vehicle 1. After the mobile terminal 7 has been authenticated, a KCP/IP connection can be established to receive the image sequence 10. For example, this image sequence 10 can be created at any time, even if no activity events have previously been received. In addition to the image sequence 10 and the corresponding events on the mobile terminal 7, the motor vehicle 1 can also independently record image sequences 10 when it is in alarm mode. These image sequences 10 can then be retrieved later on the mobile device 7 with the same method and are helpful if the user, for example, has not immediately noticed a break-in.

The invention claimed is:

1. A method for monitoring an interior of a motor vehicle by a monitoring system, the method comprising:
  detecting a movement of an object in the interior by a motion detection device of the monitoring system;

activating an optical detection device to record an image sequence by an electronic computing device of the monitoring system;
  transmitting the image sequence to a mobile terminal of a user of the monitoring system by a communication device of the monitoring system;
  monitoring for a presence of an access authorization device for the motor vehicle;
  suppressing the monitoring of the interior when the access authorization device is present in the motor vehicle; and
  initiating the monitoring of the interior in an absence of the access authorization device.

2. The method as claimed in claim 1, wherein the optical detection device is a camera.

3. The method as claimed in claim 1, wherein the motion detection device is as a radar sensor device.

4. The method as claimed in claim 3, wherein the radar sensor device is operated in a 60 GHz frequency band.

5. The method as claimed in claim 1, further comprising carrying out an object classification via the motion detection device.

6. The method as claimed in claim 5, wherein, depending on the object classification, activation of the optical detection device is suppressed.

7. The method as claimed in claim 5, wherein, depending on the object classification, a child lock device is activated.

8. The method as claimed in claim 1, further comprising:
  determining, by the motion detection device, a position of the object in the interior; and
  transmitting the position to the mobile terminal with the image sequence.

9. The method as claimed in claim 1, further comprising:
  transmitting a current position of the mobile terminal to the monitoring system; and
  initiating monitoring of the interior depending on the current position.

10. The method as claimed in claim 1, wherein, when a movement of the object in the interior is detected, a warning message is also transmitted to the mobile terminal.

11. The method as claimed in claim 1, further comprising storing the image sequence on a memory device of the monitoring system for future retrieval by the mobile terminal or by a display device of the motor vehicle.

12. A non-transitory computer readable medium comprising program instructions, which, when executed by a computer of a monitoring system for monitoring an interior of a motor vehicle, causes the computer to;
  detect a movement of an object in the interior by a motion detection device of the monitoring system;
  activate an optical detection device to record an image sequence by an electronic computing device of the monitoring system;
  transmit the image sequence to a mobile terminal of a user of the monitoring system by a communication device of the monitoring system;
  monitor for a presence of an access authorization device for the motor vehicle;
  suppress the monitoring of the interior when the access authorization device is present in the motor vehicle; and
  initiate the monitoring of the interior in an absence of the access authorization device.

13. A monitoring system for monitoring an interior of a motor vehicle, the monitoring system comprising:
  at least one motion detection device;
  an optical detection device;

an electronic computing device; and a communication device, wherein the monitoring system is configured to:

detect movement of an object in the interior, activate the optical detection device to record an image sequence, transmit the image sequence to a mobile terminal, monitor for a presence of an access authorization device for the motor vehicle, suppress the monitoring of the interior when the access authorization device is present in the motor vehicle, and initiate the monitoring of the interior in an absence of the access authorization device.

* * * * *